US008154535B2

(12) United States Patent
Tateuchi et al.

(10) Patent No.: US 8,154,535 B2
(45) Date of Patent: Apr. 10, 2012

(54) DISPLAY APPARATUS AND POSITION DETECTING METHOD

(75) Inventors: Mitsuru Tateuchi, Kanagawa (JP);
Tsutomu Harada, Kanagawa (JP);
Kazunori Yamaguchi, Kanagawa (JP);
Ryoichi Tsuzaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 442 days.

(21) Appl. No.: 12/390,925

(22) Filed: Feb. 23, 2009

(65) Prior Publication Data

US 2009/0225058 A1    Sep. 10, 2009

(30) Foreign Application Priority Data

Mar. 10, 2008   (JP) .................................. 2008-059501

(51) Int. Cl.
*G06F 3/042* (2006.01)
(52) U.S. Cl. .................... 345/175; 178/18.09; 178/18.11
(58) Field of Classification Search .................... 345/45, 345/175; 178/18.09, 18.11
See application file for complete search history.

(56) References Cited

U.S. PATENT DOCUMENTS

| 2007/0013646 A1* | 1/2007 | Harada ........................ 345/102 |
| 2009/0161051 A1* | 6/2009 | Fukunaga et al. ............ 349/115 |

* cited by examiner

*Primary Examiner* — Adam R Giesy
(74) *Attorney, Agent, or Firm* — Robert J. Depke; Rockey, Depke & Lyons, LLC

(57) ABSTRACT

An image generating unit of a display apparatus generates a determination image based on first and second light reception images obtained from light reception cells in a light-emission period and in a non-light-emission period, respectively. An image determining unit determines whether or not an image of an object to be detected is included in the determination image, stores data corresponding to the determination image as initial data into a storage when the object image is not included in the determination image, and stores the data corresponding to the determination image as detection data into the storage when the object image is included in the determination image. A position determining unit determines at least an object position based on an image represented by the detection data in the storage and an image represented by the initial data in the storage.

9 Claims, 10 Drawing Sheets

DISPLAY APPARATUS AND POSITION DETECTING METHOD

The present application claims priority to Japanese Patent Application JP2008-059501, filed in the Japanese Patent Office Mar. 10, 2008; the entire contents of which is incorporated herein by reference.

BACKGROUND OF THE INVENTION

1. Field of the Invention

The present invention relates to a display apparatus having the function of detecting a position and/or the like of an object (object to be detected) which comes into contact with or comes close to a display surface, and a position detecting method for detecting the position and/or the like of the object to be detected.

2. Description of the Related Art

Techniques for detecting a position and/or the like of an object which comes into contact with or comes close to a display surface of a display apparatus are known. Among them, a typified and popularized technique is a display apparatus having a touch panel. There are touch panels of various types, and a popularized one is a touch panel of a type of detecting capacitance. In this type, when a touch panel is touched with a finger, a change in surface charge of the panel is captured to detect the position and/or the like of an object. By using such a touch panel, the user is possible to perform operation intuitively.

Recently, various techniques of enabling the position and/or the like of an object to be detected without providing such a touch panel on the display surface are proposed. For example, in an organic EL (Electro-Luminescence) display, a technique is proposed, of intermittently performing display (light emission) in light emitting elements for image display disposed in the display surface, during the period in which the light emission stops, accumulating charges according to light reception in the light emitting elements themselves, and reading the stored charge amount. Similarly, for example, in a liquid crystal display, a technique is proposed in which light receiving elements are disposed adjacent to display pixels and, during the period in which display (light emission) stops, light is received by the light receiving elements. By using such a display apparatus, the position and/or the like of an object is detectable on the basis of a captured video image. Therefore, by using such a display apparatus, the position and/or the like of an object is detectable with a simple configuration without providing a part such as a touch panel on the display surface.

However, at the time of capturing a video image and the like of an object in such a display apparatus, the luminance of light received is influenced by the surrounding environment (brightness). Consequently, in the case of providing a display apparatus whose environment easily changes with the function of detecting the position and/or the like of an object such as a portable electronic device in particular, the light receiving conditions in the dark environment and those in the light environment are largely different from each other. It is therefore difficult to detect the position and/or the like of an object under uniform light receiving conditions.

For example, Japanese Unexamined Patent Application Publication No. 2007-25796 proposes the following measure for detecting the position and/or the like of an object. That is, in a liquid crystal display, at the time of displaying an image (moving image or still image) frame by frame, each of frame periods is halved. Then, a backlight is turned off in the first-half period to display no image, and the backlight is turned on and a display signal is simultaneously written to display pixels in the latter-half period of each of the frame periods to display an image. Further, a light reception signal is read from a light receiving element in the first-half period in which the backlight is off and the latter-half period in which the backlight is on. By using an image (first image) obtained by calculating the difference of the light reception signals, the position and/or the like of an object is detected. By the measure, the position and/or the like of an object is detectable regardless of the environment (brightness).

However, in the first image, noise which occurs in the display apparatus (for example, noise caused by light from the backlight and variations in sensitivity of the light receiving elements) is included. There is a case that it is difficult to detect the position and/or the like of an object due to the influence of noise. To address the problem, the Japanese Patent Unexamined Patent Application Publication No. 2007-25796 proposes another measure. That is, in a state where there is no external light and there is no surface reflecting object (that is, in a state where there is no object which is in contact with or is close to the surface), light reception signals are read from light receiving elements in both of the case where a backlight is off and the case where the backlight is on. An image (second image) obtained by calculating the difference of the light reception signals is stored in advance in a memory. At the time of detecting the position and/or the like of an object, each pixel data of the second image is subtracted from each pixel data of the first image, thereby eliminating the noise component from the first image.

SUMMARY OF THE INVENTION

In the technique of the Japanese Patent Unexamined Patent Application Publication No. 2007-25796, however, it is necessary to store the second image in the memory in advance. Therefore, in the case where noise occurring in the display apparatus changes due to a change in the environment of the display apparatus, change with time, or the like, there is a possibility that the noise component may not be effectively removed from the first image. Although the Japanese Patent Unexamined Patent Application Publication No. 2007-25796 describes that the second image may be obtained at any time by an operation of the user of the display apparatus, a concrete method of generating a state where there is no external light and there is no surface reflecting object by the user is not disclosed. It is also unrealistic for the user to generate such a state.

It is therefore desirable to provide a display apparatus and a position detecting method capable of detecting a position and/or the like of an object which comes into contact with or comes close to the display surface of the display apparatus with high precision by automatically and effectively eliminating the noise component occurring in the display apparatus.

A displaying apparatus according to an embodiment of the present invention includes: a panel part having a plurality of light emission cells which display an image on a display surface and emit detection light, and a plurality of light reception cells which receive the detection light incident from a side of the display surface; a storage storing initial data and detection data; an image generating unit generating an image for determination on the basis of a first light reception image and a second light reception image, in which the first light reception image is obtained from the plurality of light reception cells in a first period in which the detection light is emitted from the display surface, and the second light reception image is obtained from the plurality of light reception cells in a second period in which the detection light is not emitted from the display surface; an image determining unit determining whether or not an image of an object to be detected is included in the image for determination, storing data corresponding to the image for determination as the initial data into the storage when the image of the object to be detected is determined not to be included in the image for determination, and storing the data corresponding to the image for determination as the detection data into the storage when the image of the object to be detected is determined to be included in the image for determination; and a position determining unit determining at least a position of the object to be detected on the basis of an image represented by the detection data stored in the storage and an image represented by the initial data stored in the storage.

A position detecting method according to an embodiment of the present invention detects at least a position of an object to be detected in a display apparatus including a panel part having a plurality of light emission cells which display an image on a display surface and emit detection light and a plurality of light reception cells which receive the detection light incident from a side of the display surface, and a storage storing initial data and detection data. The method includes the steps of: generating an image for determination on the basis of a first light reception image and a second light reception image, in which the first light reception image is obtained from the plurality of light reception cells in a first period in which the detection light is emitted from the display surface, and the second light reception image is obtained from the plurality of light reception cells in a second period in which the detection light is not emitted from the display surface; determining whether or not an image of the object to be detected is included in the image for determination, storing data corresponding to the image for determination as the initial data into the storage when the image of the object to be detected is determined not to be included in the image for determination, and storing the data corresponding to the image for determination as the detection data into the storage when the image of the object to be detected is determined to be included in the image for determination; and determining at least the position of the object to be detected on the basis of an image represented by the detection data stored in the storage and an image represented by the initial data stored in the storage.

In the display apparatus and the position detecting method according to the embodiments of the present invention, when emission of the detection light and non-emission of the detection light are sequentially performed, the data corresponding to the image for determination generated on the basis of the first light reception image obtained in the light emission period of the detection light and the second light reception image obtained in the non-light emission period of the detection light is used for determining at least the position of the object to be detected. As a result, the influence of external light at the time of detecting the position and/or the like of the object is eliminated. Therefore, even in the case where surrounding environment (brightness) changes, regardless of the surrounding environment, the position and/or the like of the object which comes into contact with or comes close to the display surface of a display apparatus is easily detected. In addition, the data corresponding to the image for determination determined as an image which does not include the image of the object to be detected is used as the initial data. Consequently, the influence of noise occurring in the display apparatus at the time of detecting the position and/or the like of the object is eliminated. Therefore, even in the case where noise occurring in the display apparatus changes due to a change in the environment of the display apparatus, a change with time, or the like, a noise component generated in the display apparatus is eliminated automatically and effectively, without requesting any operation from the user of the display apparatus.

According to the display apparatus and the position detecting method of the embodiments of the present invention, by automatically and effectively eliminating the noise component occurring in the display apparatus, the position and/or the like of the object which comes into contact with or comes close to the display surface of the display apparatus is detected with high precision.

Other and further objects, features and advantages of the invention will appear more fully from the following description.

DETAILED DESCRIPTION OF THE PREFERRED EMBODIMENTS

One embodiment of the present invention will be described in detail hereinbelow with reference to the drawings.

Figure 1:
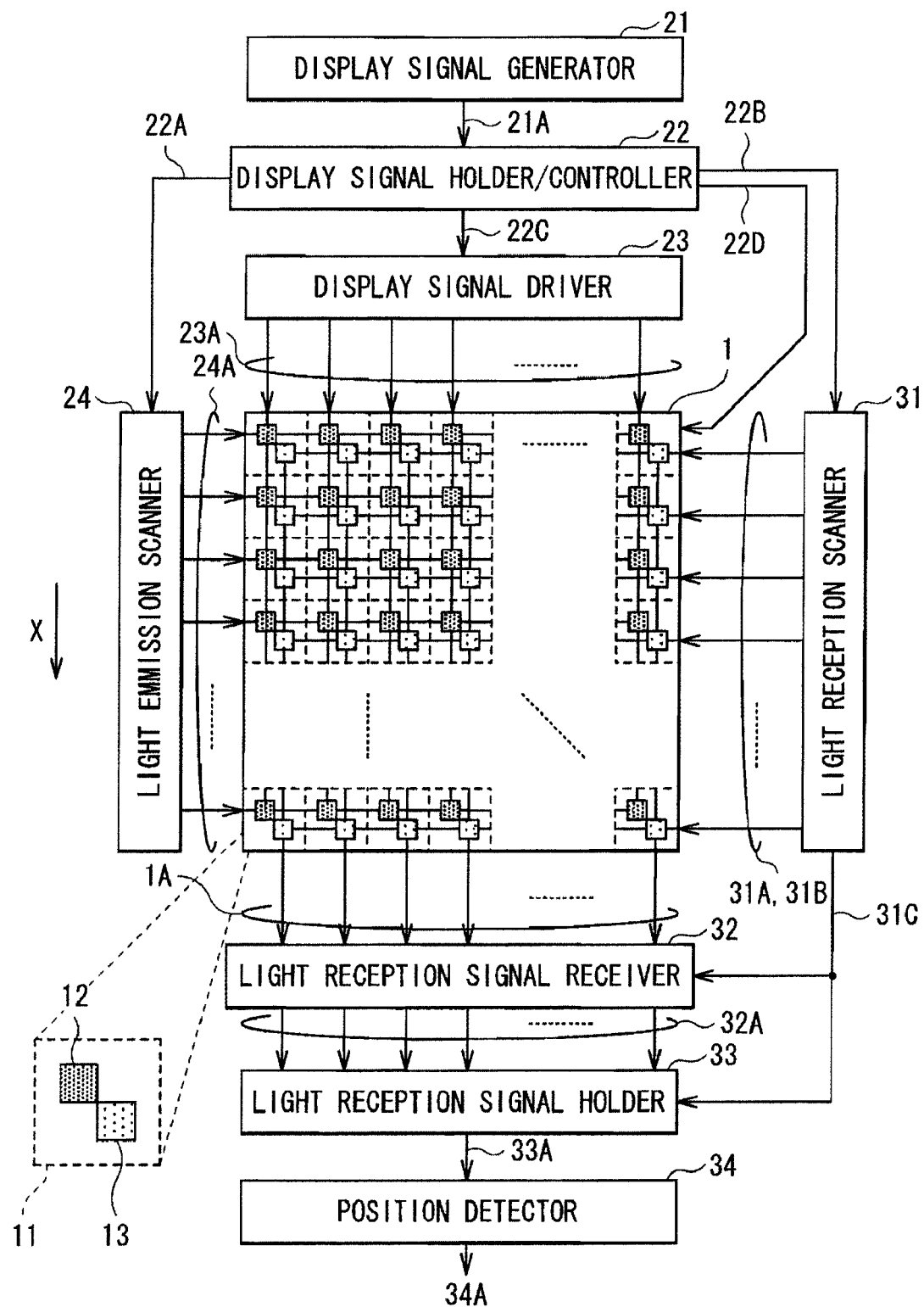
FIG. 1 is a block diagram showing the general configuration of a display apparatus according to an embodiment of the present invention.

FIG. 1 shows a general configuration of a display apparatus according to an embodiment of the present invention. The display apparatus has a display unit 1, a display signal generator 21, a display signal holder/controller 22, a display signal driver 23, a light emission scanner 24, a light reception scanner 31, a light reception signal receiver 32, a light reception signal holder 33, and a position detector 34. The display apparatus is possible to display an image and receive light. The display apparatus displays an image based on image data on the display unit 1, and detects a position and/or the like of an object (object to be detected) which comes into contact or comes close to the display unit 1. A position detecting method according to an embodiment of the invention is embodied by the display apparatus, so that it will be described in conjunction therewith.

The display unit 1 includes an LCD (Liquid Crystal Display) in which a plurality of pixels 11 are disposed in a matrix on the entire surface of the display unit 1. As will be described later, the display unit 1 displays an image of a predetermined figure, character, or the like while performing line-sequential operation.

Figure 2:
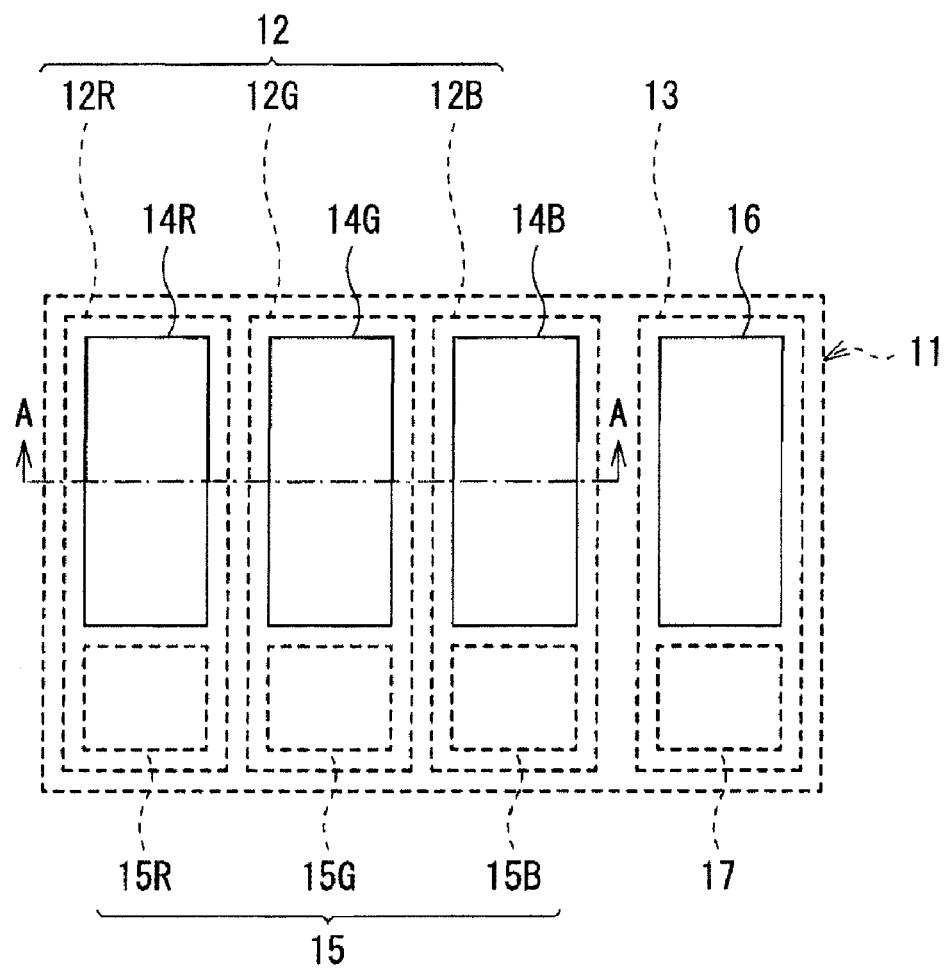
FIG. 2 is a plan view schematically showing an example of the configuration of light emission cells and light reception cells in FIG. 1.

FIG. 2 is a plan view showing an example of the configuration of each pixel 11. Each pixel 11 is constructed by light emission cells 12 for emitting visible light toward a display surface 10 (refer to FIG. 3) of the display unit 1, and a light reception cell 13 for receiving the visible light incident from the display surface 10 side. The light emission cells 12 have a red light emission cell 12R for emitting red light, a green light emission cell 12G for emitting green light, and a blue light emission cell 12B for emitting blue light. The red light emission cell 12R has a red light emitting element 14R as a part for emitting red light and a TFT (Thin Film Transistor) circuit part 15R for driving the red light emitting element 14R. Similarly, the green light emission cell 12G has a green light emitting element 14G as a part for emitting green light and a TFT circuit part 15G for driving the green light emitting element 14G. The blue light emission cell 12B has a blue light emitting element 14B as a part for emitting blue light and a TFT circuit part 15B for driving the blue light emitting element 14B. On the other hand, the light reception cell 13 has a light receiving element 16 as a part for receiving visible light and a light reception sensor circuit part 17 for driving the light receiving element 16. The light receiving element 16 includes, for example, a photodiode. The details of the connection relations between the red light emitting element 14R, the green light emitting element 14G, and the blue light emitting element 14B and the TFT circuit parts 15 and the connection relations between the TFT circuit parts 15 and the display signal driver 23, the light emission scanner 24, the light reception scanner 31, and the light reception signal receiver 32 will be described later (FIG. 4).

Figure 3:
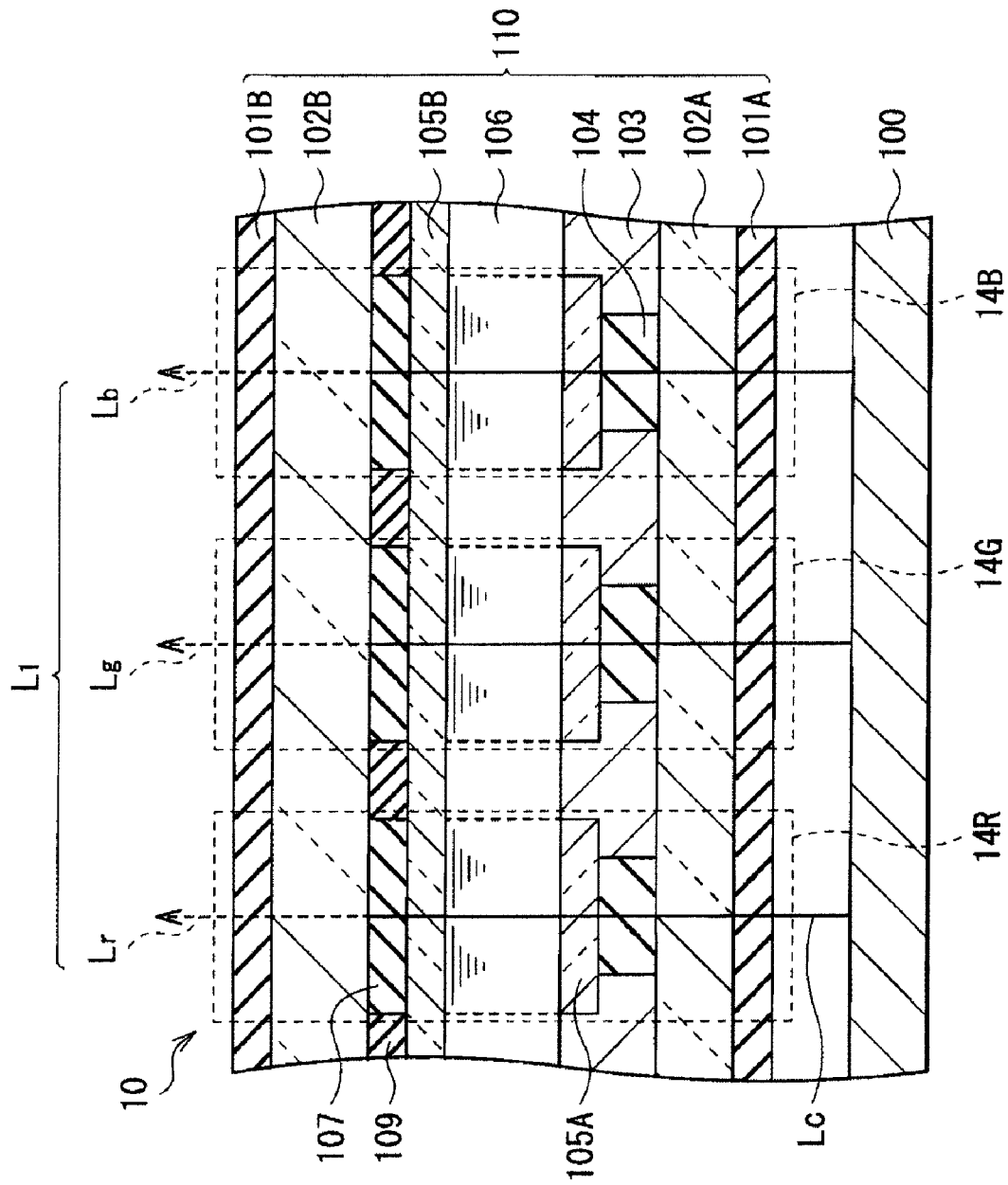
FIG. 3 is a cross section schematically showing an example of the configuration of light emitting elements in FIG. 1.
Figure 4:
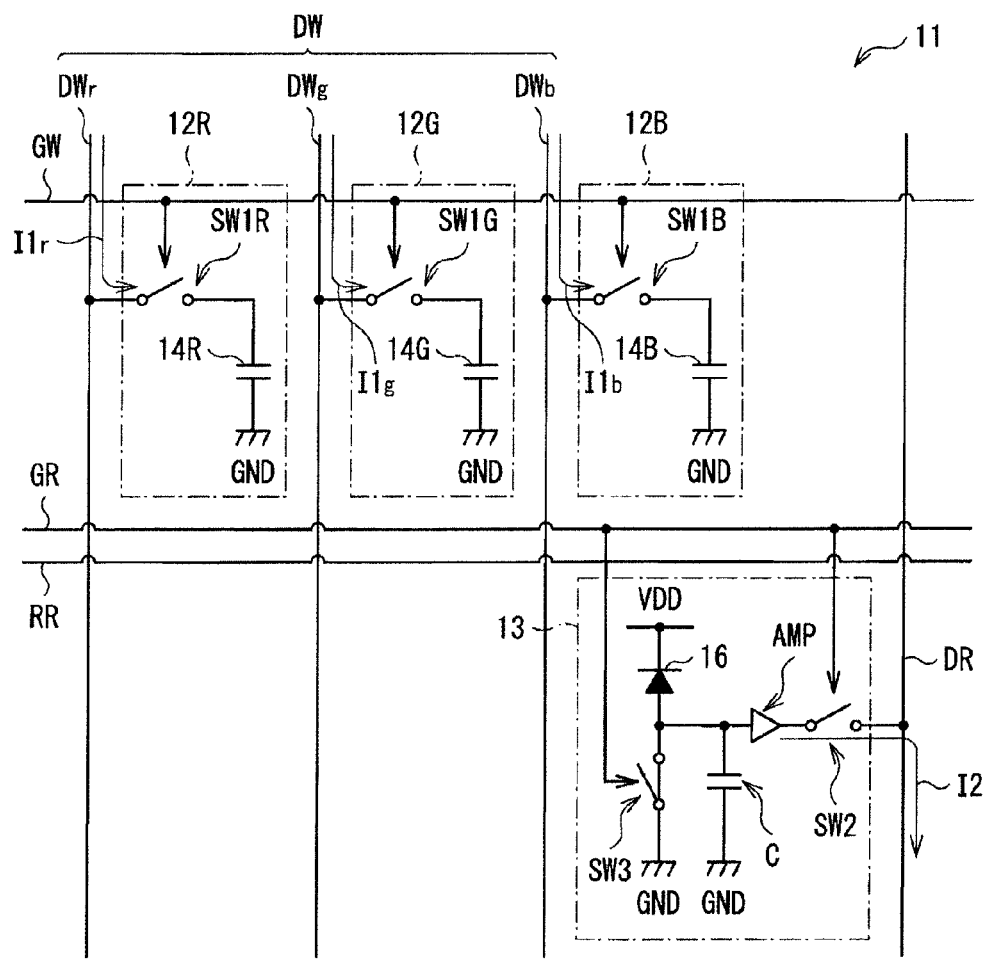
FIG. 4 is a circuit diagram schematically showing an example of the configuration of each pixel in FIG. 1.

FIG. 3 is a cross section taken along line A-A of FIG. 2 and shows an example of a sectional configuration of the display unit 1. The display unit 1 has, on a light source 100, a panel part 110 having a stack structure constructing the light emitting elements (red light emitting element 14R, green light emitting element 14G, and blue light emitting element 14B). The panel part 110 is a so-called liquid crystal display panel and concretely has, from the light source 100 side, a polarizer 101A, a transparent substrate 102A, a circuit part 103, an insulating layer 104, a transparent pixel electrode 105A, a liquid crystal layer 106, a transparent electrode 105B, a color filter 107, a black matrix 109, a transparent substrate 102B, and a polarizer 101B. The light emitting elements (red light emitting element 14R, green light emitting element 14G, and blue light emitting element 14B) are provided in a liquid crystal display panel in which the liquid crystal layer 106 is provided between the transparent substrates 102A and 102B which face each other.

The light source 100 is a backlight for emitting light in the visible light range toward the liquid crystal elements. The transparent substrates 102A and 102B are made of, for example, a glass material. The transparent substrates 102A and 102B may be made of a transparent plastic material or the like instead of the glass material.

The circuit part 103 is a part corresponding to the TFT circuit part 15 and the light reception sensor circuit part 17 shown in FIG. 2 and is electrically connected to the transparent pixel electrodes 105A. The transparent pixel electrodes 105A are disposed in the light emitting elements and are made of a transparent material such as ITO (Indium Tin Oxide). On the other hand, the transparent electrode 105B is a common electrode facing the transparent electrode 105A and is made of a transparent material such as ITO like the transparent electrode 105A. The insulating layer 104 is formed between the circuit parts 103. With such a configuration, a voltage according to display data is applied across the transparent electrodes 105A and 105B, and backlight light Lo from the light source 100 passes through the liquid crystal layer 106 or is interrupted.

The color filter 107 is disposed in an area corresponding to the light emission cells 12 (red light emission cell 12R, green light emission cell 12G, and blue light emission cell 12B) and selectively transmits light in the wavelength range corresponding to the light emission color of itself in the backlight light Lo passed through the liquid crystal layer 106. The black matrix 109 is disposed between the color filters 107 and interrupts the backlight light Lo from the light source 100 so that the backlight light Lo does not go to the display surface 10 side.

FIG. 4 shows an example of the circuit configuration in each of the pixels 11. Each pixel 11 has, as described above, the light emission cell including the red light emission cell 12R, green light emission cell 12G, and blue light emission cell 12B, and the light reception cell 13. To the light emission cell 12, a display data supply line DW connected to the display signal driver 23 and a light emission gate line GW connected to the light emission scanner 24 are connected. Concretely, a display data supply line DWr and the light emission gate line GW are connected to the red light emission cell 12R. A display data supply line DWg and the light emission gate line GW are connected to the green light emission cell 12G. A display data supply line DWb and the light emission gate line GW are connected to the blue light emission cell 12B. On the other hand, to the light reception cell 13, a light reception gate line GR connected to the light reception scanner 31, a light reception reset line RR, and a data read line DR connected to the light reception signal receiver 32 are connected.

The red light emission cell 12R has the red light emitting element 14R and the TFT circuit part 15R including a light emitting element selection switch SW1R for driving the red light emitting element 14R. One end of the light emitting element selection switch SW1R is connected to the display data supply line DWr, the other end is connected to one end of the red light emitting element 14R (concretely, the transparent pixel electrode 105A) and, further, the other end of the red light emitting element 14R (concretely, the transparent electrode 105B) is grounded. Similarly, the green light emission cell 12G has the green light emitting element 14G and the TFT circuit part 15G including a light emitting element selection switch SW1G for driving the green light emitting element 14G. One end of the light emitting element selection switch SW1G is connected to the display data supply line DWg, the other end is connected to one end of the green light emitting element 14G and, further, the other end of the green light emitting element 14G is grounded. The blue light emission cell 12B has the blue light emitting element 14B and the TFT circuit part 15B including a light emitting element selection switch SW1B for driving the blue light emitting element 14B. One end of the light emitting element selection switch SW1B is connected to the display data supply line DWb, the other end is connected to one end of the blue light emitting element 14B and, further, the other end of the blue light emitting element 14B is grounded. The on/off operation of each of the light emitting element selection switches SW1R, SW1G, and SW1B is controlled by the light emission gate line GW. Each of the light emitting element selection switches SW1R, SW1G, and SW1B includes a switch element such as a TFT.

On the other hand, the light reception cell 13 has the light receiving element 16 (the photodiode in the example of FIG. 4), and light receiving element selection switches SW2 and SW3, a buffer amplifier AMP, and a capacitor C provided in the light emitting element circuit part 17. One end of the light receiving element 16 is connected to a power source line VDD and the other end is connected to the input terminal of the buffer amplifier AMP. An output terminal of the buffer amplifier AMP is connected to one end of the light receiving element selection switch SW2, and the other end of the light receiving element selection switch SW2 is connected to the data read line DR. Further, an input terminal of the buffer amplifier AMP is connected to one end of the light receiving element selection switch SW3 and one end of the capacitor C. The other end of the light receiving element selection switch SW3 and that of the capacitor C are grounded. The on/off operation of the light receiving element selection switch SW2 is controlled by the light reception gate line GR. The on/off operation of the light receiving element selection switch SW3 is controlled by the light reception reset line RR. Each of the light receiving element selection switches SW2 and SW3 includes a switch element such as a TFT.

Next, the configuration other than the display unit 1 in the display apparatus (the display signal generator 21, display signal holder/controller 22, display signal driver 23, light emission scanner 24, light reception scanner 31, light reception signal receiver 32, light reception signal holder 33, and position detector 34) will be described.

The display signal generator 21 generates a display signal 21A to be displayed on the display unit 1 for each frame a field on the basis of image data supplied from a not-shown CPU (Central Processing Unit) or the like. The display signal 21A generated as described above is output to the display signal holder/controller 22.

Figure 5:
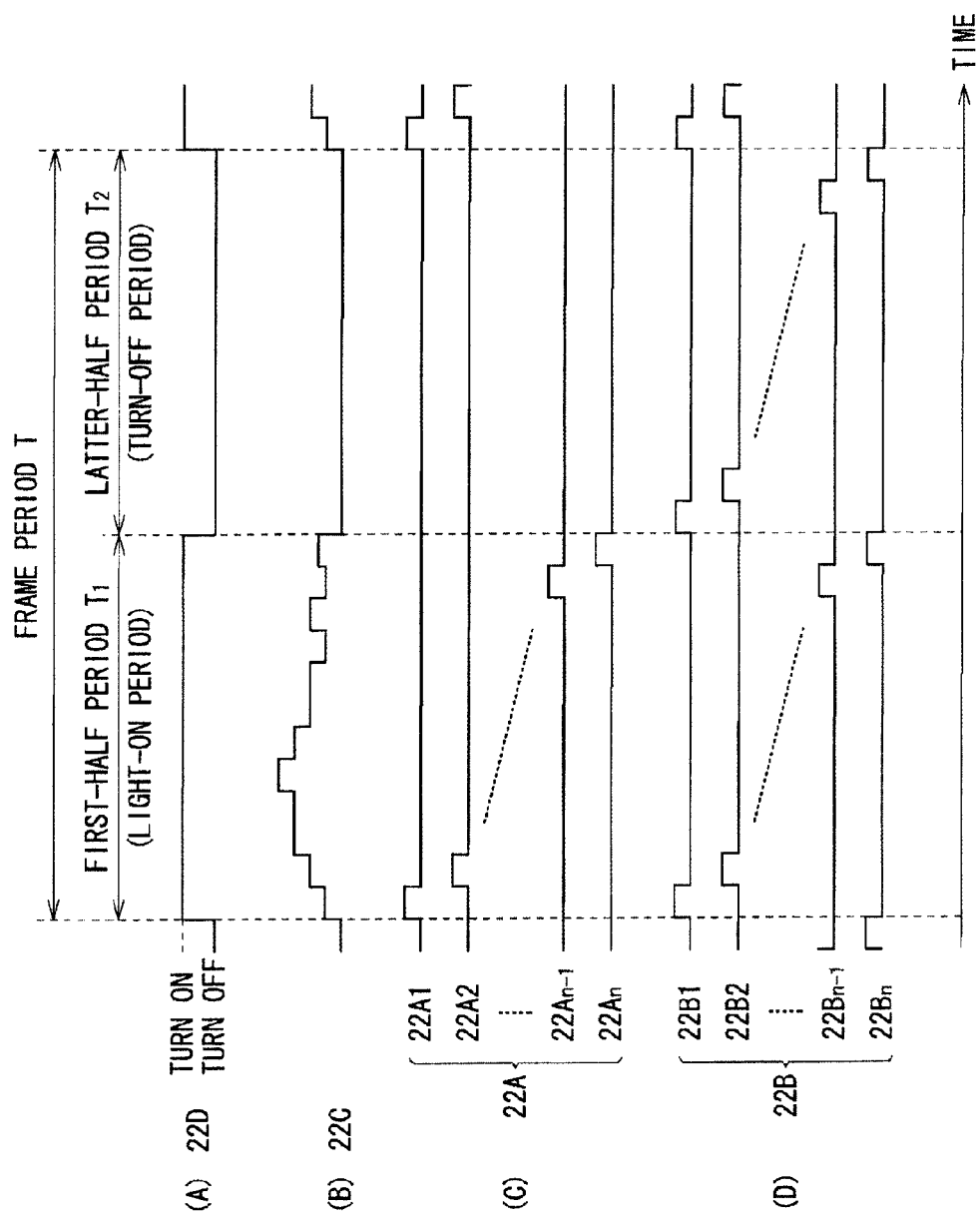
FIG. 5 is a timing chart showing an example of a process of detecting an object to be detected by line sequential operation.
Figure 6:
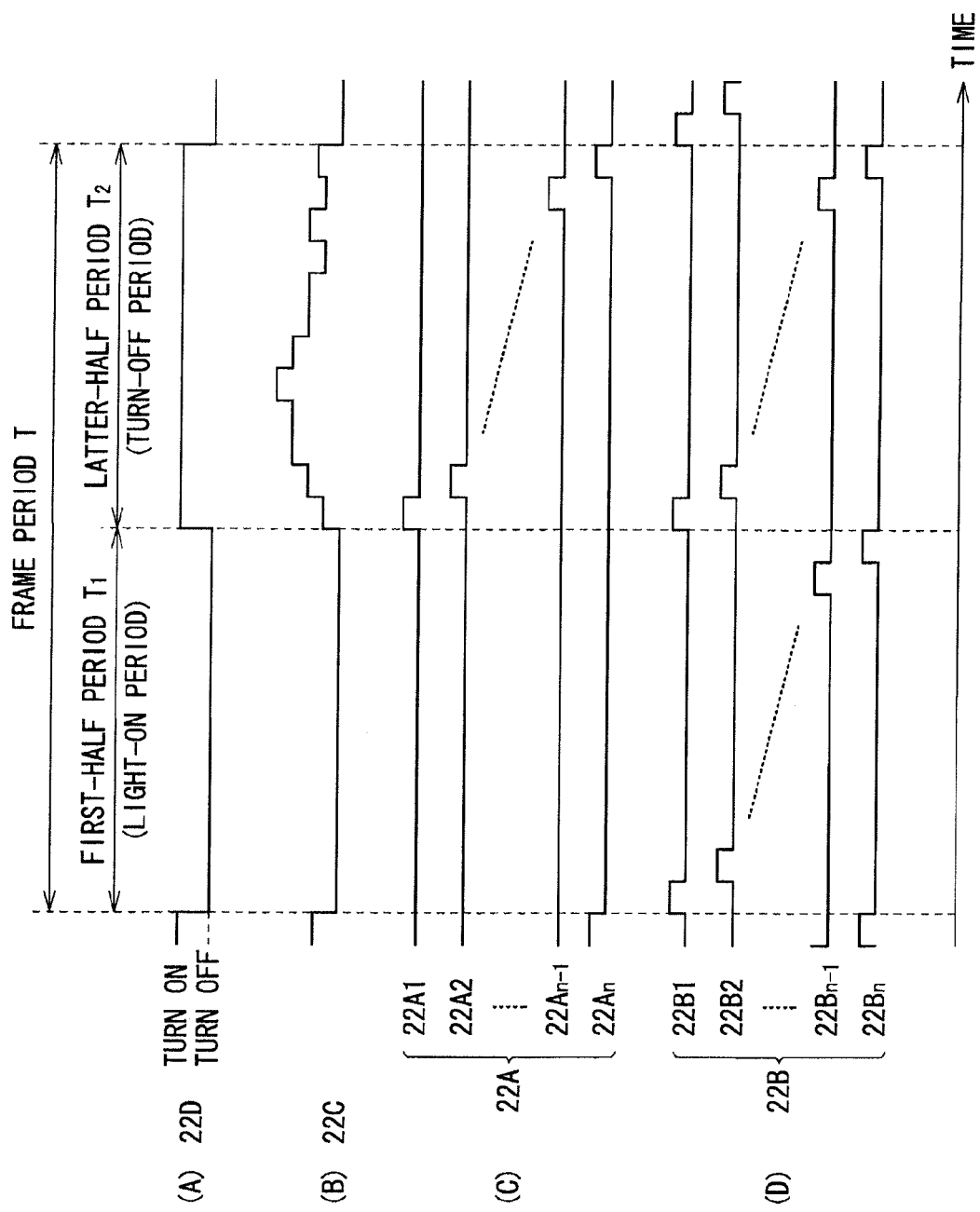
FIG. 6 is a timing chart showing another example of a process of detecting an object to be detected by line sequential operation.

The display signal holder/controller 22 holds the display signal 21A output from the display signal generator 21 by storing the display signal 21A screen by screen (every display of a field) into a field memory including, for example, an SRAM (Static Random Access Memory). The display signal holder/controller 22 also plays the role of performing control so that the display signal driver 23 and the light emission scanner 24 for driving the light emission cells 12, the light reception scanner 31 for driving the light reception cells 13, and the light source 100 (which will be described later) of the display unit 1 operate interlockingly. Concretely, the display signal holder/controller 22 outputs a light emission timing control signal 22A to the light emission scanner 24, outputs a light reception timing control signal 22B to the light reception scanner 31, outputs a display signal 22C of one horizontal line based on the display signal 21A of one screen held in the field memory to the display signal driver 23, and outputs a light source control signal 22D for turning on/off the light source 100 to the light source 100 of the display unit 1. More specifically, for example, as shown in FIGS. 5 and 6, at the time of displaying an image (moving image or still image) frame by frame, the display signal holder/controller 22 halves each of frame periods T. Then, the display signal holder/controller 22 outputs a signal for turning on the light source 100 as the light source control signal 22D to turn on the entire light source 100 in the first-half period T1 or in the latter-half period T2. During the light-on period, the display signal holder/controller 22 outputs the light emission timing control signal 22A, the light reception timing control signal 22B, and the display signal 22C to make the light emission cells 12 and the light reception cells 13 synchronously driven in the direction of the arrow X (see FIG. 1) every horizontal line (line-sequential drive). In addition, during a period different from the light-on period which is either the first-half or latter half period in each frame period, the display signal holder/controller 22 outputs a signal for turning off the light source 100 as a light source control signal 22D to turn off the entire light source 100 and, during the turn-off period, outputs the light reception timing control signal 22B to make the light reception cells 13 driven in the direction of the arrow X every horizontal line (line-sequential drive) every horizontal line. The light reception cells 13 may not be continuously driven in one frame cycle, and the light reception cells 13 may be intermittently driven in plural frame cycles as necessary.

The display signal driver 23 supplies display data to the light emission cell 12 to be driven in accordance with the display signal 22C of one horizontal line output from the display signal holder/controller 22. Concretely, the display signal driver 23 supplies a voltage 23A corresponding to the display data to the pixel 11 selected by the light emission scanner 24 via the data supply line DW connected to the pixels 11 of the display unit 1.

The light emission scanner 24 selects the light emission cell 12 to be driven in accordance with the light emission timing control signal 22B output from the display signal holder/controller 22. Concretely, the light emission scanner 24 supplies a light emission selection signal 24A to the visible light emission cell 12 to be driven via the light emission gate line GW connected to the pixels 11 of the display unit 1 to control the light emitting element selection switches SW1R, SW1G, and SW1B. In such a manner, when the voltage to turn on the light emitting element selection switches SW1R, SW1G, and SW1B of the certain pixel 11 is applied to the light emitting element selection switches SW1R, SW1G, and SW1B by the light emission selection signal 24A, an operation of emitting light having luminance corresponding to the voltage 23A supplied from the display signal driver 23 is performed in that pixel 11. When the light emission scanner 24 and the display signal driver 23 perform the line-sequential operation interlockingly, an image corresponding to arbitrary display data is displayed on the display unit 1.

The light reception scanner 31 selects the light reception cell 13 to be driven in accordance with the light reception timing control signal 22B output from the display signal holder/controller 22. Concretely, the light reception scanner 31 supplies a light reception selection signal 31A to the light reception cell 13 to be driven via the light reception gate line GR connected to the pixels 11 of the display unit 1 to control the light receiving element selection switch SW2, and supplies a reset signal 31B to the light reception cell 13 to be driven via the light reception reset line RR connected to the pixels 11 in the display unit 1 to control the light receiving element selection switch SW3. That is, when the voltage to turn on the light receiving element selection switch SW3 in the certain pixel 11 is applied to the light receiving element selection switch SW3 by the reset signal 31B, charges accumulated in the capacitor C in that pixel 11 are reset. When the voltage to turn on the light receiving element selection switch SW2 in the certain pixel 11 is applied to the light receiving element selection switch SW2 by the light reception selection signal 31A, charges accumulated in the capacitor C in correspondence with the light reception amount in the light receiving element 16 in that pixel 11 are output as a light reception signal 1A to the light reception signal receiver 32 via the buffer amplifier AMP and the data read line DR. In such a manner, visible light is received by the light reception cell 13.

The light reception scanner 31 also plays the role of outputting a light reception block control signal 31C to the light reception signal receiver 32 and the light reception signal holder 33 to control the operation of a part contributing to the light receiving operation.

The light reception signal receiver 32 obtains the light reception signals 1A of one horizontal line output from the light reception cells 13 in accordance with the light reception block control signal 31C output from the light reception scanner 31. The light reception signals 1A of one horizontal line thus obtained are output to the light reception signal holder 33.

The light reception signal holder 33 reconstructs a light reception signal 32A output from the light reception signal receiver 32 to a light reception signal 33A (light reception image) every screen (every display of one field) in accordance with the light reception block control signal 31C output from the light reception scanner 31, and stores and holds the light reception signal 33A in a field memory (not shown) such as an SRAM. The light reception signal 33A thus stored in the field memory is output to the position detector 34. The light reception signal holder 33 may have a storing device other than the memory and may hold, for example, the light reception signal 33A as analog data.

The position detector 34 specifies the position and/or the like of an object (object to be detected) which comes into contact with or comes close to the display surface 10 by performing a predetermined signal process on the light reception signal 33A output from the light reception signal holder 33. In the case where the light reception signal holder 33 holds the light reception signal 33A as analog data, the position detector 34 may perform an analog-to-digital conversion (A/D conversion) and, after that, execute the signal process.

Figure 7:
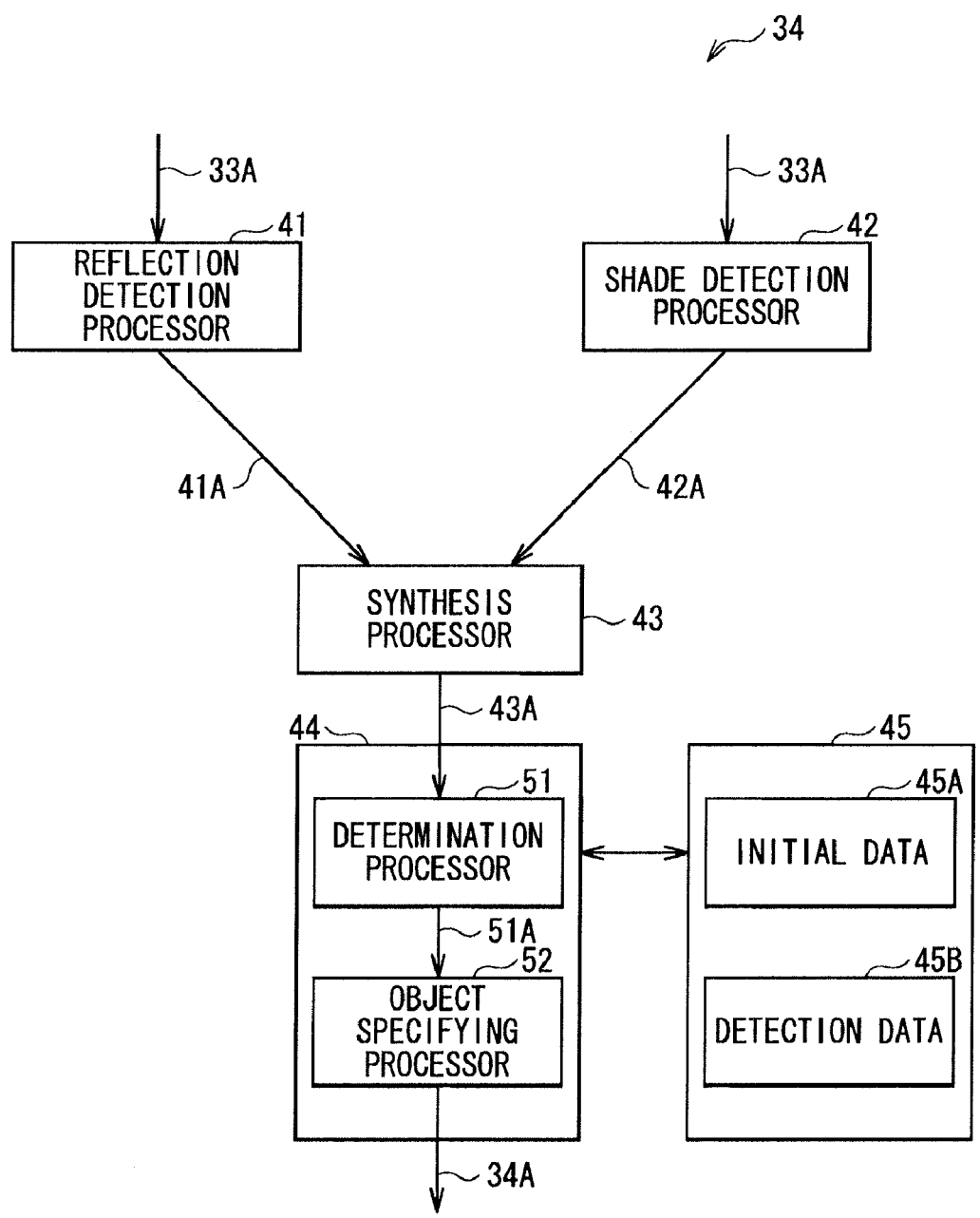
FIG. 7 is a block diagram schematically showing an example of the configuration of a position detector in FIG. 1.

FIG. 7 shows functional blocks of the position detector 34. The position detector 34 has, as shown in FIG. 7, a reflection detection processor 41, a shade detection processor 42, a synthesis processor 43, a proximity detection processor 44, and a storage 45. The reflection detection processor 41, the shade detection processor 42, or the synthesis processor 43 in the present embodiment corresponds to one of examples of the "image generating unit" of the present invention.

According to the light source control signal 22D output from the display signal holder/controller 22, the reflection detection processor 41 classifies the light reception signals 33A output from the light reception signal holder 33 to a light-on light reception image (light reception image when an image is displayed) obtained in a light-on period (image display period) and a light-off light reception image (light reception image when no image is displayed) obtained in a light-off period (no-image display period). The reflection detection processor 41 obtains the difference between the light-on light reception image and the light-off light reception image (for example, by subtracting data of the light-off light reception image from the light-on light reception image), generates a difference image 41A, and outputs the difference image 41A to the synthesis processor 43. The light-on light reception image is a light reception image obtained in a period in which detection light of the light reception cell 13 is output from the display surface 10. The light-off light reception image is a light reception image obtained in a period in which the detection light of the light reception cell 13 is not output from the display surface 10.

Since each of the light-on light reception image and the light-off light reception image includes a component of external light, by taking the difference between the light-on light reception image and the light-off light reception image, the component of the external light is eliminated. As a result, an image which does not depend on the surrounding environment (brightness) (difference image 41A) is obtainable.

Figure 8A:
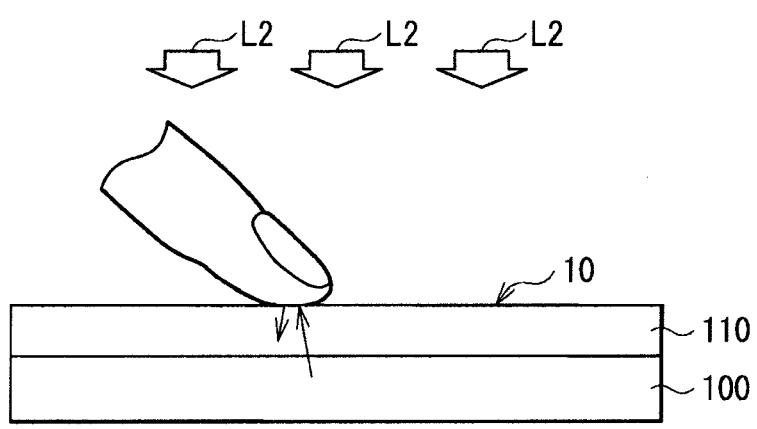
FIG. 8A is a side view schematically showing a state where external light is strong.

For example, when incident external light L2 is strong as shown in FIG. 8A, a light reception output voltage Von1 in a state where the light source 100 is on has a voltage value Va corresponding to brightness of the external light L2 in the area other than the place touched with a finger. The light reception output voltage Von1 drops to a voltage value Vb corresponding to reflectance of light from the light source 100 at the surface of the touched finger in the place touched with the finger. On the contrary, although a light reception output voltage Voff1 in a state where the light source 100 is turned off similarly has the voltage value Va corresponding to brightness of the external light L2 in the area other than the place touched with the finger, in the place touched with a finger, the external light L2 is interrupted, and the light reception output voltage Voff1 has a voltage value Vc at a very low level.

Figure 9A:
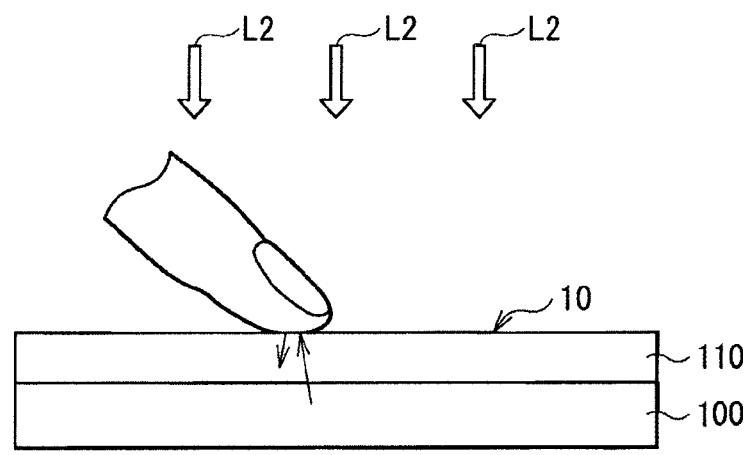
FIG. 9A is a side view schematically showing a state where external light is weak.

In a state where the incident external light L2 is weak (or hardly exists) as shown in FIG. 9A, a reception light output voltage Von2 in a state where the light source 100 is on has a value close to the voltage value Vc of a very low level for the reason that there is no external light. In the place touched with the finger, the reception light output voltage Von2 rises to the voltage value Vb corresponding to reflectance of light from the light source 100 on the surface of the touched finger. On the contrary, a reception light output voltage Voff2 in the state where the light source 100 is turned off is unchanged and has the voltage value Vc of the very low level in both of the place touched with the finger and the other area.

Figure 8B:
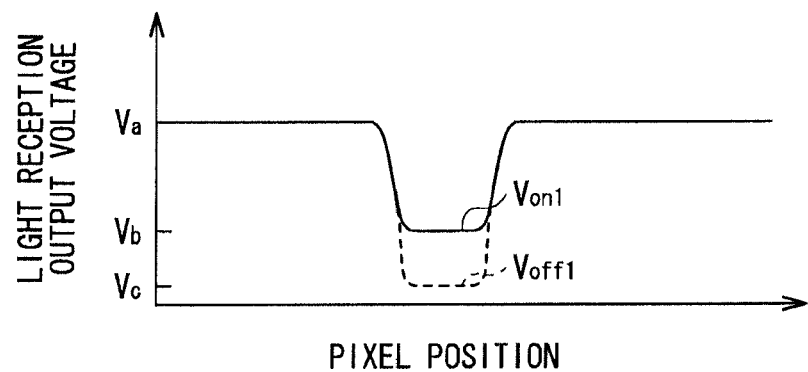
FIG. 8B is a waveform chart showing an example of reception light output voltage when external light is strong.
Figure 9B:
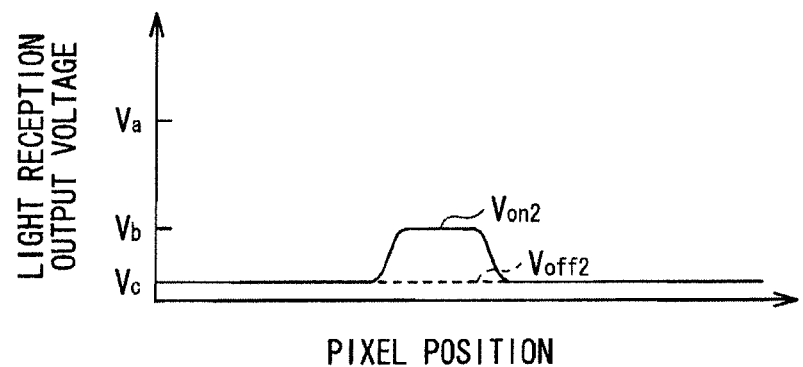
FIG. 9B is a waveform chart showing an example of reception light output voltage when external light is weak.

As understood by comparison between FIGS. 8B and 9B, in a place where the display surface 10 of the panel part 110 is not touched, the light reception output voltage in the case where there is the external light L2 and that in the case where the external light L2 is weak (or hardly exists) are largely different from each other. However, the light reception output voltage in the case where the light source 100 is on and that in the case where the light source 100 is off are unchanged and are the same. Therefore, by detecting the difference between the light-on light reception image and the light-off light reception image, an image from which the component of the external light L2 is eliminated (difference image 41A) is obtainable. In the place where the finger touches, irrespective of the intensity of the external light L2, a difference (increase of voltage) between the voltage Vb when the light source 100 is on and the voltage Vc when the light source 100 is off is almost the same. Consequently, the difference image 41A in the case where there is the external light L2 and that in the case where the external light L2 is weak (or hardly exists) are almost the same. Therefore, it is unlikely that the profile of the difference image 41A obtained fluctuates due to the influence of the external light L2. As described above, in the embodiment, the image which does not depend on the surrounding environment (brightness) is obtainable.

The shade detection processor 42 generates a shade image 42A by performing the procedure described below and outputs the shade image 42A to the synthesis processor 43.

First, the shade detection processor 42 generates a reversed image and a moving-averaged image of the light-off light reception image (light reception signal 33A) obtained in the light-off period. The reversed image is obtained by, for example, reversing the brightness/darkness of the light-off light reception image. The moving-averaged image is obtained by, for example, performing an averaging process which obtains an average value of plural pixel data of a pixel region including a target pixel and its peripheral pixels in the light-off light reception image, using image data obtained by the averaging process for an averaging process on a pixel region of a next target pixel and its peripheral pixels in the light-off light reception image, sequentially shifting the target pixel, and performing the averaging process on the entire light-off light reception image.

Desirably, the size of the pixel region on which the averaging process is performed (the number of pixels in vertical direction and horizontal direction) is set on the basis of an expected size of an image of the object to be detected. For example, the size of the pixel region on which the averaging process is performed is set to the size almost the same as that of the object to be detected. In this case, when an image having a size larger than that of the pixel region to be subject to the averaging process is included in the light-off light reception image, the contour of the image is blurred by the averaging process. Therefore, for example, when the object to be detected is a fingertip, by setting the size the pixel region to be subject to the averaging process almost the same as that of an image of the fingertip, the contour of an image larger than the image of the fingertip is blurred, and at the time of generating the difference image 41A which will be described later, an image (for example, an image of a fist) larger than the image of the fingertip is eliminated. As a result, the fist is prevented from being erroneously detected.

In the case where the averaging process is performed by using the above-described method, the peripheral region of the light-off light reception image lies out of the target pixels. In that case, it is preferable that some interpolating process be performed on the pixel data in the peripheral region. For example, pixel data of pixels at the outermost periphery of the region subjected to the averaging process in the light-off light reception image may be copied as it is as pixel data of pixels on the outside of the pixels.

Next, the shade detection processor 42 calculates a predetermined threshold for use in a subsequent process from the moving-averaged image. Concretely, a threshold is calculated on the basis of pixel data of a pixel having highest brightness (largest pixel data) in the moving-averaged image and pixel data of a pixel having lowest brightness (smallest pixel data) in the light-off light reception image prior to the averaging process (for example, by averaging the pixel data). To the pixel data of a pixel having highest brightness (largest pixel data), on assumption that an object to be detected is normally not disposed simultaneously at the four corners of the display surface 10, the average value of pixel data of pixels at the four corners may be assigned.

Then, the shade detection processor 42 generates a reversed image of the moving-averaged image. The reversed image is obtained by, for example, reversing the brightness/darkness of the moving-averaged image. Subsequently, the shade detection processor 42 obtains the difference between the reversed image of the light-off light reception image and the reversed image of the moving-averaged image (for example, by subtracting the data of the reversed image of the moving-averaged image from the data of the reversed image of the light-off light reception image), and the difference image is generated. Then, by subtracting the threshold which is obtained in advance from the pixel data of the difference image, the shade image 42A is generated.

By subtracting the threshold from the pixel data of the difference image, the value of the pixel data corresponding to the image of an object other than the object to be detected included in the difference image is decreased. As a result, erroneous detection of the object other than the object to be detected is avoided.

The synthesis processor 43 combines the difference image 41A output from the reflection detection processor 41 and the shade image 42A output from the shade detection processor 42, thereby generating a synthetic image 43A, and outputs the synthetic image 43A to the proximity detection processor 44.

Preferably, the synthesis of the difference image 41A and the shade image 42A is performed by adding data obtained by multiplying each of the pixel data of the difference image 41A with a predetermined coefficient $\alpha$ ($0<\alpha<1$) and data obtained by multiplying each of the pixel data of the shade image 42A with a predetermined coefficient ($1-\alpha$). Obviously, the synthetic image 43A may be also generated by another method.

As necessary, in place of the output (synthetic image 43A) of the synthesis processor 43, the output (difference image 41A) of the reflection detection processor 41 or the output (shade image 42A) of the shade detection processor 42 may be input to the proximity detection processor 44. For example, when a semi-transmissive liquid crystal device for the panel part 110 is used as in the embodiment, in the case such that the light source 100 is always in the off state or a black image is displayed on the panel part 110, it is preferable to input the output of the shade detection processor 42 (shade image 42A) to the proximity detection processor 44.

The proximity detection processor 44 has a determination processor 51 and an object specifying processor 52. The determination processor 51 of the present embodiment corresponds to one of examples of "image determining unit" of the present invention. The object specifying processor 52 of the embodiment corresponds to one of examples of "position determining unit" of the present invention.

The determination processor 51 determines whether or not an image of an object to be detected is included in an image generated on the basis of the outputs of the light reception signal holder 33 (light-on light reception image and light-off light reception image) and updates initial data 45A and detection data 45B in the storage 45 in accordance with the determination result. In the case where an output of the synthesis processor 43 is input to the proximity detection processor 44, an image (image for determination) generated on the basis of the output of the light reception signal holder 33 corresponds to the synthetic image 43A. In the case where an output of the reflection detection processor 41 is input to the proximity detection processor 44, the image for determination corresponds to the difference image 41A. In the case where an output of the shade detection processor 42 is input to the proximity detection processor 44, the image for determination corresponds to the shade image 42A.

Figure 10A:
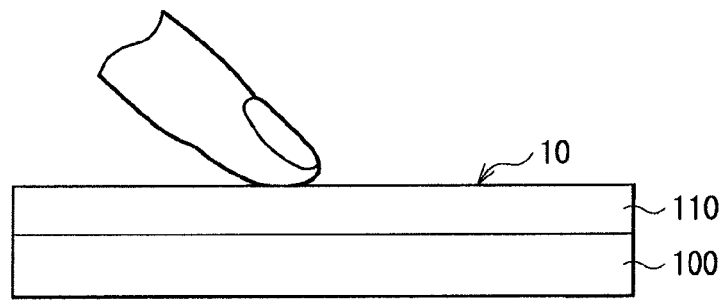
FIGS. 10A to 10C are schematic diagrams for explaining a method of determining whether an image of an object to be detected is included in an image for determination or not.
Figure 10B:
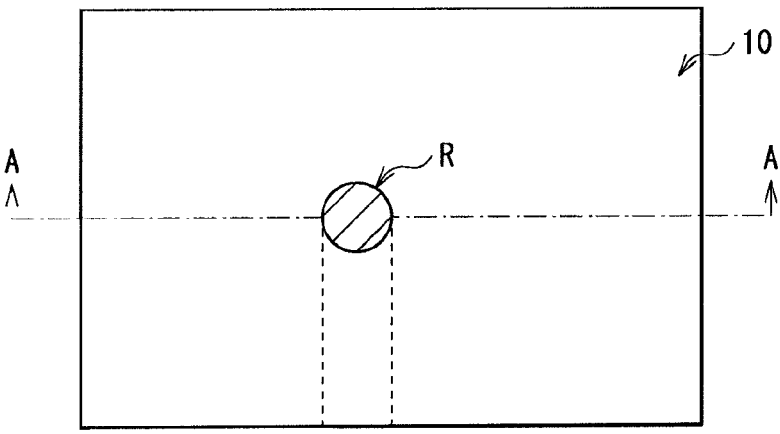
Figure 10C:
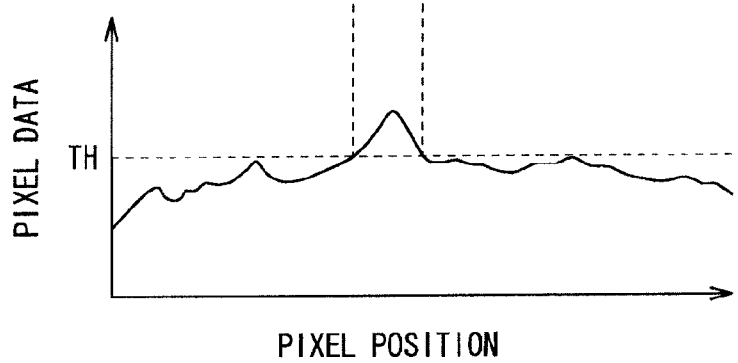

Whether an image of the object to be detected is included in the image for determination or not is determined by, for example, as shown in FIGS. 10A to 10C, detecting whether or not a pixel region R having a value exceeding a predetermined threshold TH exists in the pixel data of the image for determination, and by, in the case where the pixel region R is detected, comparing the size of the pixel region R with expected size of an image of an object to be detected. For example, in the case where the horizontal and vertical size of a target region R is equal to or larger than an expected size (M×N (where M and N are numbers of pixels)) of an image of an object to be detected, the determination processor 51 determines that the image of the object to be detected is included in the image for determination. In the case where the horizontal and vertical size of the target region R is smaller than the expected size (M×N (where M and N are numbers of pixels)) of the image of the object to be detected, the determination processor 51 determines that the image of the object to be detected is not included in the image for determination. In such a manner, the determination processor 51 determines whether an image of an object to be detected is included in an image for determination or not on the basis of a simple rule.

When the determination processor 51 determines that the image of the object to be detected is not included in the image for determination, the image for determination is stored as the initial data 45A in the storage 45. When the determination processor 51 determines that the image of the object to be detected is included in the image for determination, the image for determination is stored as the detection data 45B in the storage 45. The image for determination is stored in the storage 45 and, thereafter, a determination process end signal 51A is output to the object specifying processor 52.

In the case where default data is pre-stored as the initial data 45A in the storage 45 or in the case where an image for determination generated on the basis of outputs (light-on light reception image and light-off light reception image) of the light reception signal holder 33 in a past frame period T for example is already stored as the initial data 45A by the process of the determination processor 51, the image for determination may be overwritten as the latest initial data 45A on the storage 45. Alternatively, the storage 45 may be overwritten with a synthetic image, as the latest initial data 45A, obtained by combining the image already stored as the initial data 45A and the image for determination. In addition, at the time of storing the image for determination as the detection data 45B in the storage 45, the image for determination or an image obtained by performing some process on the image for determination may be stored as the detection data 45B in the storage 45.

Preferably, the synthesis between the image already stored as the initial data 45A and the image for determination newly stored as the initial data 45A is performed by adding data obtained by multiplying each of the pixel data of the image already stored as the initial data 45A with a predetermined coefficient $\beta$ ($0<\beta<1$) and data obtained by multiplying each of the pixel data of the image for determination newly stored as the initial data 45A with a predetermined coefficient ($1-\beta$). Obviously, the synthetic image may be also generated by another method.

When the determination process end signal 51A output from the determination processor 51 is received, the object specifying processor 52 generates an image for analysis by subtracting the image stored as the initial data 45A in the storage 45 from the image stored as the detection data 45B in the storage 45. The object specifying processor 52 derives the position information 44A of the object to be detected by using the image for analysis (for example, by binarizing the image for analysis), and outputs the position information 44A to, for example, a CPU (not shown).

By subtracting the image stored as the initial data 45A in the storage 45 from the image stored as the detection data 45B in the storage 45, only the value of the pixel data corresponding to the image of the object to be detected, included in the image stored as the detection data 45B in the storage 45 is extracted, so that the position information 44A is easily derived.

Next, an example of the operation of the display apparatus of the embodiment will be described in detail.

In the display apparatus, the drive signals for display (the voltage 23A and the light emission selection signal 24A) are generated by the display signal driver 23 and the light emission scanner 24 on the basis of the display data supplied from a not-shown CPU or the like. By the drive signals, the line-sequential display driving is performed in the display unit 1 and an image is displayed. In addition, the light reception drive signal (the light reception selection signal 31A) is generated from the light reception scanner 31. By the drive signal, the line-sequential light reception driving is performed in the display unit 1, and an image is captured. At this time, the light source 100 is driven by the display signal holder/controller 22, and the on/off operation synchronized with the display unit 1 is performed.

Concretely, for example, as shown in FIG. 5, at the time of displaying an image frame by frame, each of frame periods T is halved. In a first-half period T1, a signal for turning on the light source 100 is output as the light source control signal 22D to turn on the light source 100. In the light-on period, the display drive signals (the voltage 23A and the light emission selection signal 24A) and the light reception drive signal (the light reception selection signal 31A) are output. The light emission cells 12 and the light reception cells 13 are driven synchronously every horizontal line, for example, in the direction of the arrow X (line-sequential driving) (refer to FIG. 1). Thereby, images in the frame period are displayed, and the light reception signal 33A in the first-half period T1 is obtained as the light-on light reception image (the light reception image when an image is displayed). Further, in a latter-half period T2 of each of the frame periods, a signal for turning off the light source 100 is output as the light source control signal 22D to turn off the entire light source 100. In the light-off period, the light reception drive signal (light reception selection signal 31A) is output to drive the light reception cells 13 every horizontal line in the direction of, for example, the arrow X (line-sequential driving), and the light reception signal 33A in the latter-half period T2 is obtained as the light-off light reception image (light reception image when no image is displayed). In the case where the light reception cells 13 are driven intermittently in plural frame cycles, the light reception signal 33A is obtained as the light reception image in the light-off period only for the frame periods in which the light reception cells 13 are driven.

In the position detector 34, signal process is performed on the basis of the light reception signal 33A output from the light reception signal holder 33, and the position and/or the like of an object (object to be detected) which comes into contact with or comes close to the display surface 10 is specified.

[Image Generating Step]

Concretely, first, in the reflection detection processor 41, the light reception signals 33A output from the light reception signal holder 33 are classified to a light-on light reception image and a light-off light reception image in accordance with the light source control signal 22D output from the display signal holder/controller 22, and the difference image 41A is generated from the difference between the light-on light reception image and the light-off light reception image. In addition, in the shade detection processor 42, a reversed image and a moving-averaged image are generated from the light-off light reception image, and a reversed image and a threshold are generated from the moving-averaged image. Further, in the shade detection processor 42, a difference image is generated from the difference between the reversed image of the light-off light reception image and the reversed image of the moving-averaged image, and the shade image 42A is generated by subtracting the threshold preliminarily determined from the pixel data of the difference image. Subsequently, in the synthesis processor 43, the synthesis image 43A is generated by combining the difference image 41A and the shade image 42A according to a predetermined rule.

[Image Determining Step]

Next, in the determination processor 51, whether or not an image of an object to be detected is included in the image for determination (the synthesis image 43A, the difference image 41A or the shade image 42A) generated on the basis of the outputs (the light-on light reception image and the light-off light reception image) of the light reception signal holder 33 is determined on the basis of the simple rule. Further, in the determination processor 51, when it is determined that the image of the object to be detected is not included in the above-described image, the image is stored as the initial data 45A in the storage 45. When it is determined that the image of the object to be detected is included in the above-described image, the image is stored as the detection data 45B in the storage 45.

In the case where default data is pre-stored as the initial data 45A in the storage 45 or in the case where an image for determination generated on the basis of outputs (light-on light reception image and light-off light reception image) of the light reception signal holder 33 in a past frame period T for example is already stored as the initial data 45A by the process of the determination processor 51, the image for determination may be overwritten as the latest initial data 45A on the storage 45. Alternatively, the storage 45 may be overwritten with a synthetic image, as the latest initial data 45A, obtained by combining the image already stored as the initial data 45A and the image for determination in accordance with a predetermined rule.

[Position Deriving Step]

Next, in the object specifying processor 52, an image for analysis is generated by subtracting the image stored as the initial data 45A in the storage 45 from the image stored as the detection data 45B in the storage 45. By using the analysis image, the position information 44A of the object to be detected is derived and is output to, for example, a CPU (not shown). In such a manner, in the embodiment, the position and/or the like of the object (object to be detected) which comes into contact with or comes close to the display surface 10 is specified.

As described above, in the embodiment, when turn-on of the light source 100 (display of an image) and turn-off of the light source 100 (display of no image) are sequentially performed in a one-frame period, a light-on light reception image (light reception image when an image is displayed) is obtained in the light-on period (image display period), and a light-off light reception image (light reception image when no image is displayed) is obtained in the light-off period (no-image display period). Images obtained by performing a predetermined signal process on the light-on light reception image and the light-off light reception image are used for deriving the position of the object to be detected. Therefore, the influence of external light at the time of detecting the position and/or the like of an object is eliminated. Consequently, even when the surrounding environment (brightness) changes, irrespective of the surrounding environment, the position and/or the like of an object which comes into contact with or comes close to the display surface of the display apparatus is easily detected.

Since the image obtained by performing a predetermined process on the image for determination is used as the initial data 45A, the influence of noise occurring in the display apparatus at the time of detecting the position and/or the like of an object is eliminated. Consequently, even in the case where noise occurring in the display apparatus is changed by change in the surrounding environment of the display apparatus, change with time, or the like, the noise component generated in the display apparatus is effectively eliminated. Therefore, the position and/or the like of an object which comes into contact with or comes close to the display surface of the display apparatus is detected with high precision. In addition, since it is unnecessary to store data for eliminating noise generated in the display apparatus prepared at the time of shipment from a factory as the initial data 45A in the storage 45, the man-hour at the time of shipment from a factory is reduced.

In the embodiment, whether an image of an object to be detected is included in the image for determination or not is determined on the basis of the simple rule as described above. Therefore, the process time and load required to generate data to be stored in the storage 45 as the initial data 45A is sufficiently reduced, and decrease in the response speed of position detection is suppressed to the minimum. In addition, since the initial data 45A is automatically generated on the display apparatus side, the user of the display apparatus is not requested to perform some operation. Therefore, the burden on the user is lessened.

In the embodiment, in the case where default data is pre-stored as the initial data 45A in the storage 45, or in the case where an image for determination generated in the past on the basis of outputs (the light-on light reception image and the light-off light reception image) of the light reception signal holder 33 in the past frame period T for example is already stored as the initial data 45A by the process of the determination processor 51, a synthesis image obtained by combining the image already stored as the initial data 45A and the image for determination may be overwritten as the latest initial data 45A in the storage 45. In this case, when whether or not an image of an object to be detected is included in the image for determination is determined on the basis of a simple rule, even if it is erroneously detected that the image of the object to be detected is not included in the image for determination in spite of the fact that an image of an object to be detected is included in the image for determination, the influence of the erroneous operation is prevented from being prolonged. Further, deterioration in the precision of the position detection caused by erroneous detection is minimized.

In the embodiment, it is unnecessary to provide a part such as a touch panel in order to detect the position of an object to be detected, so that the configuration of the display apparatus can be simplified.

In the embodiment, in the case of intermittently driving the light reception cells 13 in plural frame cycles, power consumption required to detect the position and/or the like of an object to be detected is suppressed.

Although the present invention has been described by the embodiment and its modification, the invention is not limited to the embodiment and the like but can be variously modified.

For example, in the embodiment, each of the pixels 11 has the light emission cells made by the red light emission cell 12R, the green light emission cell 12G, and the blue light emission cell 12B. The pixel 11 may also have a cell for emitting another color, or may have at least one of the light emission cells.

In the foregoing embodiment, the case where the light reception cell 13 detects visible light components in reflection light from the object to be detected of visible light emitted from the light emission cell 12 and the external light L2 has been described. Alternatively, the light emission cell 12 may emit light including an invisible light component, and the light reception cell 13 may detect the invisible light component. Since the invisible light is invisible to human eyes, detection of an object which does not exert an influence on a display image is performed. Accordingly, no influence is exerted on the display even if the invisible light is caused to pass to the front surface side, in the case where the amount of transmission light of visible light traveling from the rear surface to the front surface is almost zero like in black screen display. Therefore, the object to be detected is detectable also in the black display. More concretely, the light source 100 shown in FIG. 3 is constructed to emit infrared light together with visible light, and an infrared light transmission filter is disposed in an incident path of external light from the glass substrate 102B side to the light receiving elements 16 shown in FIG. 2, and the light receiving elements 16 detect the infrared light component from the light source 100 and an infrared light component in the external light as detection light. The absorption of the infrared light by a member such as the color filter 107 and the polarizer 101 is extremely lower than that of visible light. Therefore, the luminance of infrared light for obtaining a predetermined detection signal by the light receiving element 16 is made lower than that of visible light, so that power consumption is reduced.

In the foregoing embodiment, the case where the display unit 1 has the liquid crystal display panel (the panel unit 110) on the light source 100 has been described. The display unit 1 may have a light-emitting panel in which a display element itself as a component of a pixel emits light like an organic EL panel having an organic layer between transparent substrates facing each other. In this case, by turning on/off the display elements, display or no-display of an image, and turn-on or turn-off of the light are simultaneously performed. Consequently, it is unnecessary to provide the light source 100 at the back of the display unit 1 and simultaneously perform the operation of turning on/off the display element and the operation of turning on/off the light source 100.

The present application contains subject matter related to that disclosed in Japanese Priority Patent Application JP 2008-059501 filed in the Japan Patent Office on Mar. 10, 2008, the entire content of which is hereby incorporated by reference.

Obviously many modifications and variations of the present invention are possible in the light of the above teachings. It is therefore to be understood that within the scope of the appended claims the invention may be practiced otherwise than as specifically described.

What is claimed is:

1. A display apparatus comprising:
a panel part having a plurality of light emission cells which display an image on a display surface and emit detection light, and a plurality of light reception cells which receive a portion of the detection light incident from a side of the display surface;
a storage unit storing initial data and detection data;
an image generating unit generating an image on the basis of a first light reception image and a second light reception image, the first light reception image being obtained from the plurality of light reception cells in a first period in which the detection light is emitted from the display surface, and the second light reception image being obtained from the plurality of light reception cells in a second period in which the detection light is not emitted from the display surface;
an image determining unit determining whether or not an image of a detected object is included in the image, storing data corresponding to the image as the initial data into the storage unit when it is determined that there is no detected object included in the image, and storing data corresponding to the image as the detection data into the storage unit when it is determined that a detected object is included in the image; and
a position determining unit determining at least a position of the detected object on the basis of an image represented by the detection data stored in the storage unit and an image represented by the initial data, wherein the image generating unit generates a first reversed image and a moving-averaged image from the second light reception image, generates a second reversed image and a predetermined threshold from the moving-averaged image, generates a difference image from a difference between the first reversed image and the second reversed image, and generates an image for determination by subtracting the threshold from each pixel data of the difference image.

2. The display apparatus according to claim 1, wherein the image generating unit generates the image for determination by obtaining a difference between each pixel data of the first light reception image and each pixel data of the second light reception image.

3. A display apparatus comprising:
a panel part having a plurality of light emission cells which display an image on a display surface and emit detection light, and a plurality of light reception cells which receive a portion of the detection light incident from a side of the display surface;
a storage unit storing initial data and detection data;
an image generating unit generating an image on the basis of a first light reception image and a second light reception image, the first light reception image being obtained from the plurality of light reception cells in a first period in which the detection light is emitted from the display surface, and the second light reception image being obtained from the plurality of light reception cells in a second period in which the detection light is not emitted from the display surface;
an image determining unit determining whether or not an image of a detected object is included in the image, storing data corresponding to the image as the initial data into the storage unit when it is determined that there is no detected object included in the image, and storing data corresponding to the image as the detection data into the storage unit when it is determined that a detected object is included in the image; and
a position determining unit determining at least a position of the detected object on the basis of an image represented by the detection data stored in the storage unit and an image represented by the initial data wherein the image generating unit comprises:
a difference image generating unit generating a first difference image from a difference between each pixel data of the first light reception image and each pixel data of the second light reception image;
a shade image generating unit for generating a first reversed image and a moving-averaged image from the second light reception image, generating a second reversed image and a predetermined threshold from the moving-averaged image, generating a second difference image from a difference between the first reversed image and the second reversed image, and generating a shade image by subtracting the threshold from each pixel data of the second difference image; and
a synthesis image generating unit for generating the image for determination by combining the first difference image and the shade image in accordance with a predetermined rule.

4. A display apparatus comprising:
a panel part having a plurality of light emission cells which display an image on a display surface and emit detection light, and a plurality of light reception cells which receive a portion of the detection light incident from a side of the display surface;
a storage unit storing initial data and detection data
an image generating unit generating an image on the basis of a first light reception image and a second light reception image, the first light reception image being obtained from the plurality of light reception cells in a first period in which the detection light is emitted from the display surface, and the second light reception image being obtained from the plurality of light reception cells in a second period in which the detection light is not emitted from the display surface;

an image determining unit determining whether or not an image of a detected object is included in the image, storing data corresponding to the image as the initial data into the storage unit when it is determined that there is no detected object included in the image, and storing data corresponding to the image as the detection data into the storage unit when it is determined that a detected object is included in the image; and a position determining unit determining at least a position of the detected object on the basis of an image represented by the detection data stored in the storage unit and an image represented by the initial data wherein the image determining unit detects whether or not a pixel region having a value exceeding a predetermined threshold exists and, when the pixel region is detected, compares a size of the pixel region with a size expected as the image of the object to be detected, to determine whether or not the image of the object to be detected is included in the image for determination.

5. A display apparatus comprising:

a panel part having a plurality of light emission cells which display an image on a display surface and emit detection light, and a plurality of light reception cells which receive a portion of the detection light incident from a side of the display surface;

a storage unit storing initial data and detection data;

an image generating unit generating an image on the basis of a first light reception image and a second light reception image the first light reception image being obtained from the plurality of light reception cells in a first period in which the detection light is emitted from the display surface, and the second light reception image being obtained from the plurality of light reception cells in a second period in which the detection light is not emitted from the display surface;

an image determining unit determining whether or not an image of a detected object is included in the image, storing data corresponding to the image as the initial data into the storage unit when it is determined that there is no detected object included in the image, and storing data corresponding to the image as the detection data into the storage unit when it is determined that a detected object is included in the image; and, a position determining unit determining at least a position of the detected object on the basis of an image represented by the detection data stored in the storage unit and an image represented by the initial data, wherein the first period is a display period in which the image is displayed on the display surface, the second period is a non-display period in which the image is not displayed on the display surface, and the detection light is display light displaying the image.

6. A display apparatus comprising:

a panel part having a plurality of light emission cells which display an image on a display surface and emit detection light, and a plurality of light reception cells which receive a portion of the detection light incident from a side of the display surface;

a storage unit storing initial data and detection data an image generating unit generating an image on the basis of a first light reception image and a second light reception image, the first light reception image being obtained from the plurality of light reception cells in a first period in which the detection light is emitted from the display surface, and the second light reception image being obtained from the plurality of light reception cells in a second period in which the detection light is not emitted from the display surface;

an image determining unit determining whether or not an image of a detected object is included in the image, storing data corresponding to the image as the initial data into the storage unit when it is determined that there is no detected object included in the image, and storing data corresponding to the image as the detection data into the storage unit when it is determined that a detected object is included in the image; and a position determining unit determining at least a position of the detected object on the basis of an image represented by the detection data stored in the storage unit and an image represented by the initial data, wherein the plurality of light emission cells emit invisible light as the detection light from the display surface, together with visible light displaying the image on the display surface.

7. A display apparatus comprising:

a panel part having a plurality of light emission cells which display an image on a display surface and emit detection light and a plurality of light reception cells which receive a portion of the detection light incident from a side of the display surface;

a storage unit storing initial data and detection data;

an image generating unit generating an image on the basis of a first light reception image and a second light reception image, the first light reception image being obtained from the plurality of light reception cells in a first period in which the detection light is emitted from the display surface, and the second light reception image being obtained from the plurality of light reception cells in a second period in which the detection light is not emitted from the display surface;

an image determining unit determining whether or not an image of a detected object is included in the image, storing data corresponding to the image as the initial data into the storage unit when it is determined that there is no detected object included in the image, and storing data corresponding to the image as the detection data into the storage unit when it is determined that a detected object is included in the image; and a position determining unit determining at least a position of the detected object on the basis of an image represented by the detection data stored in the storage unit and an image represented by the initial data, wherein the panel part is a liquid crystal display panel having a liquid crystal layer between transparent substrates facing each other, and the invisible light is infrared light.

8. A display apparatus comprising:

a panel part having a plurality of light emission cells which display an image on a display surface and emit detection light, and a plurality of light reception cell which receive a portion of the detection light incident from a side of the display surface;

an image generating unit generating an image on the basis of a first light reception image and a second light reception image, the first light reception image being obtained from the plurality of light reception cells in a second period in which the detection light is emitted from the display surface, and the second light reception image being obtained from the plurality of light reception cells in a second period in which the detection light is not emitted from the display surface; and an image determining unit determining whether or not a detected object is included in the image;

wherein the first period is a display period in which the image is displayed on the display surface, the second period is a non-display period in which the image is not displayed on the display surface, and the detection light is display light displaying the image.

9. A display apparatus comprising:

a panel part having a plurality of light emission cells which display an image on a display surface and emit detection light, and a plurality of light reception cells which receive a portion of the detection light incident from a side of the display surface;

an image generating unit generating an image on the basis of a first light reception image and a second light reception image, the first light reception image being obtained from the plurality of light reception cells in a first period in which the detection light is emitted from the display surface, and the second light reception image being obtained from the plurality of light reception cells in a second period in which the detection light is not emitted from the display surface; and an image determining unit determining whether or not an image of a detected object is included in the image;

wherein the plurality of light emission cells emit invisible light as the detection light from the display surface, together with visible light displaying the image on the display surface.

* * * * *